(12) United States Patent
Kim

(10) Patent No.: US 12,534,082 B2
(45) Date of Patent: Jan. 27, 2026

(54) VEHICLE FOR CONTROLLING REGENERATIVE BRAKING AND A METHOD OF CONTROLLING THE SAME

(71) Applicants: HYUNDAI MOTOR COMPANY, Seoul (KR); KIA CORPORATION, Seoul (KR)

(72) Inventor: Woo Kuen Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 232 days.

(21) Appl. No.: 18/206,727

(22) Filed: Jun. 7, 2023

(65) Prior Publication Data

US 2024/0123993 A1 Apr. 18, 2024

(30) Foreign Application Priority Data

Oct. 14, 2022 (KR) .......... 10-2022-0132023

(51) Int. Cl.
*B60W 30/18* (2012.01)
*B60W 40/06* (2012.01)
*B60W 50/00* (2006.01)

(52) U.S. Cl.
CPC ...... *B60W 30/18127* (2013.01); *B60W 40/06* (2013.01); *B60W 2050/0026* (2013.01); *B60W 2552/05* (2020.02); *B60W 2710/18* (2013.01)

(58) Field of Classification Search
CPC .......... B60W 30/18127; B60W 40/06; B60W 2050/0026; B60W 2552/05; B60W 2710/18; B60L 7/10
See application file for complete search history.

(56) References Cited

U.S. PATENT DOCUMENTS

| | | | |
|---|---|---|---|
| 2013/0049945 A1* | 2/2013 | Crombez | B60K 35/10 340/453 |
| 2015/0298686 A1* | 10/2015 | Itagaki | B60W 10/08 180/65.265 |
| 2016/0090095 A1* | 3/2016 | Momose | B60W 10/04 701/84 |
| 2019/0100204 A1* | 4/2019 | Plianos | B60W 30/18127 |
| 2019/0276000 A1* | 9/2019 | Suzuki | B60W 30/19 |
| 2022/0048493 A1* | 2/2022 | Crisp | B60W 10/11 |
| 2022/0185121 A1 | 6/2022 | Sawada et al. | |
| 2023/0034858 A1* | 2/2023 | Gloceri | B60W 30/16 |

* cited by examiner

*Primary Examiner* — Aniss Chad
*Assistant Examiner* — Stephanie T Su
(74) *Attorney, Agent, or Firm* — Morgan, Lewis & Bockius LLP

(57) ABSTRACT

A vehicle and a method of controlling the same includes a driving state detector configured to detect a driving state of an electric vehicle, a storage configured for storing a map table for engine brake torque values according to engine types and gear ratios of an internal combustion engine vehicle, a driver configured to drive the electric vehicle, and a regenerative braking controller electrically connected to the driving state detector, the storage and the driver and configured to control, based on the driving state of the electric vehicle detected by the driving state detector and the map table, the driver so that the electric vehicle performs regenerative braking based on each torque value.

17 Claims, 8 Drawing Sheets

VEHICLE FOR CONTROLLING REGENERATIVE BRAKING AND A METHOD OF CONTROLLING THE SAME

CROSS-REFERENCE TO RELATED APPLICATION(S)

The present application claims priority to Korean Patent Application No. 10-2022-0132023, filed on Oct. 14, 2022, the entire contents of which is incorporated herein for all purposes by this reference.

BACKGROUND OF THE PRESENT DISCLOSURE

Field of the Present Disclosure

The present disclosure relates to a vehicle, and more particularly, to a vehicle configured for controlling regenerative braking of an electric vehicle and a method of controlling the same.

Description of Related Art

Generally, vehicles may be divided into internal combustion engine vehicles that generate mechanical power using fuel and electric vehicles that generate mechanical power using electricity. The electric vehicles are driven by electric motor and may perform regenerative braking in which a battery is charged by converting kinetic energy into electrical energy using the electric motor while braking.

Regenerative braking may convert kinetic energy of a vehicle into electrical energy using a motor connected to driving wheels, store the converted electrical energy in a battery, and then reuse the stored electrical energy while driving, improving fuel efficiency of the vehicle.

In a conventional electric vehicle, regenerative braking is performed by reflecting a fixed torque value based on regenerative braking levels preset by a user. However, when regenerative braking is performed at the fixed torque value, sensitivity different from that of engine brake according to gear ratios generated by a combination of a transmission and an engine when driving the vehicle with a conventional internal combustion engine appears. This is because the engine brake of an internal combustion engine has a torque value that varies depending on gear ratios that vary according to the vehicle speed, while the regenerative braking level of the conventional electric vehicle operates with the fixed torque value.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle configured for showing sensitivity similar to an internal combustion engine vehicle when regenerative braking is performed in an electric vehicle and a method of controlling the same.

Additional aspects of the present disclosure will be set forth in part in the description which follows, and in part, will be obvious from the description, or may be learned by practice of the present disclosure.

In accordance with an aspect of the present disclosure, a vehicle includes a driving state detector configured to detect a driving state of an electric vehicle, a storage configured for storing a map table for engine brake torque values according to engine types and gear ratios of an internal combustion engine vehicle, a driver configured to drive the electric vehicle, and a regenerative braking controller electrically connected to the driving state detector, the storage and the driver and configured to control, based on the driving state of the electric vehicle detected by the driving state detector and the map table, the driver such that the electric vehicle performs regenerative braking based on each torque value.

The vehicle may further include a map information provider including road information related to a road on which the electric vehicle is traveling, wherein the regenerative braking controller is further configured to control, based on the road information about which the electric vehicle is traveling, the driving state of the electric vehicle, and the map table, the driver so that the electric vehicle is configured to perform regenerative braking based on the torque value.

The regenerative braking controller may be configured to determine which road the electric vehicle travels on among city roads, highways, and general roads through the map information provider.

The regenerative braking controller may further determine whether the electric vehicle is positioned on an inclined terrain and whether the electric vehicle is in a rapid acceleration state, through the driving state detector.

The map table may include information on the engine brake torque values based on the engine types and the gear ratios of the internal combustion engine vehicle.

The vehicle may further include an input device in which information is input by a user so that the electric vehicle performs the regenerative braking based on the torque value, and a display configured for displaying information on which the regenerative braking of the electric vehicle is performed.

In accordance with another aspect of the present disclosure, a method of controlling a vehicle is provided. The method includes setting a map table for engine brake torque values according to engine types and gear ratios of an internal combustion engine vehicle such that an electric vehicle performs regenerative braking based on each torque value, determining a driving state of the electric vehicle, determining, based on the driving state of the electric vehicle and the map table, the torque value according to the driving state of the electric vehicle, and performing regenerative braking of the electric vehicle according to the torque value according to the driving state of the electric vehicle.

The method may further include determining whether the electric vehicle performs regenerative braking based on the torque value.

The map table may be provided in plurality, determining whether to perform regenerative braking may be selecting one of the plurality of map tables, and setting the map table may be setting the map table selected in determining whether to perform regenerative braking.

The method may further include performing, when the electric vehicle does not perform the regenerative braking based on the torque value, regenerative braking according to a preset fixed regenerative braking level.

The determining of the driving state of the electric vehicle may include determining at least one of road information on which the electric vehicle is traveling, whether the electric vehicle is positioned on an inclined terrain, and whether the electric vehicle is in a rapid acceleration state.

The road information about which the electric vehicle is traveling may be one of city roads, highways, and general roads.

The determining of the torque value according to the driving state of the electric vehicle may be determined by determining a virtual engine brake torque value based on the map table according to the driving state of the electric vehicle and a speed of the electric vehicle.

The performing of regenerative braking of the electric vehicle may be performed by determining a regenerative braking torque value by use of the virtual engine brake torque value.

The performing of regenerative braking of the electric vehicle may be performed by changing a regenerative braking level according to the determined regenerative braking torque value.

The method may further include informing a user of the changed regenerative braking level.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
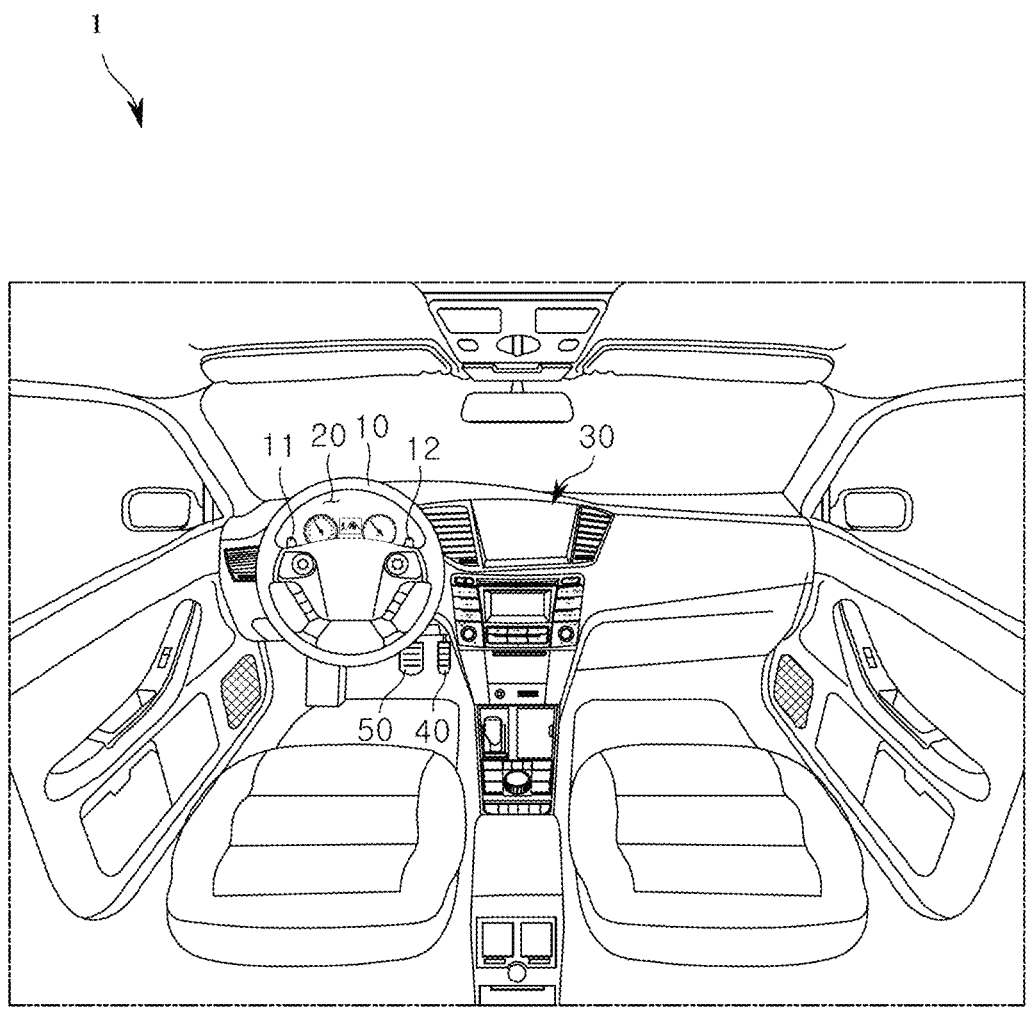
FIG. 1 is a view exemplarily illustrating an interior of a vehicle according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Reference will now be made in detail to the exemplarily embodiments of the present disclosure, examples of which are illustrated in the accompanying drawings, wherein like reference numerals refer to like elements throughout. The present specification does not describe all elements of the included exemplarily embodiments and detailed descriptions of what is well known in the art or redundant descriptions on substantially the same configurations have been omitted. The terms 'part', 'module', 'member', 'block' and the like as used in the specification may be implemented in software or hardware. Furthermore, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements included in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, various embodiments of the present disclosure will be described in detail with reference to the accompanying drawings.

Figure 2:
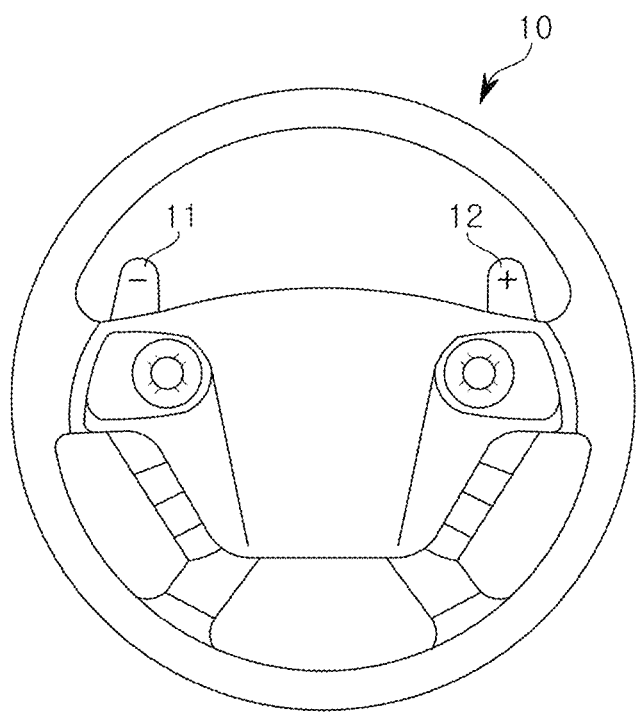
FIG. 2 is a view exemplarily illustrating a steering wheel provided with paddle shifters of a vehicle according to an exemplary embodiment of the present disclosure.

Referring to FIG. 1 and FIG. 2, an electric vehicle 1 according to an exemplary embodiment of the present disclosure may include a steering wheel 10, a first paddle shifter 11, a second paddle shifter 12, a display 20, and a user interface device 30. The display 20 and the user interface device 30 may be disposed on a dashboard inside the electric vehicle 1, and the display 20 may also be referred to as a cluster.

The steering wheel 10 may be manipulated by a user to change a driving direction of the electric vehicle 1, and the first paddle shifter 11 and the second paddle shifter 12 may include a variety of shapes and be placed on the steering wheel 10. For example, the first paddle shifter 11 and the second paddle shifter 12 may be disposed on the steering wheel 10 in a form of levers or switches.

The first paddle shifter 11 may be disposed on a left side of the steering wheel 10, and the second paddle shifter 12 may be disposed on a right side of the steering wheel 10. Accordingly, while holding the steering wheel 10, users may manipulate the first paddle shifter 11 with his left hand and the second paddle shifter 12 with his right hand. At the instant time, the first paddle shifter 11 and the second paddle shifter 12 may be manipulated by users pulling toward his or her body.

The first paddle shifter 11 and the second paddle shifter 12 may be used to adjust braking force of the electric vehicle 1. For example, when the first paddle shifter 11 is pulled, the braking force thereof may decrease, and when the second paddle shifter 12 is pulled, the braking force thereof may increase.

Figure 3:
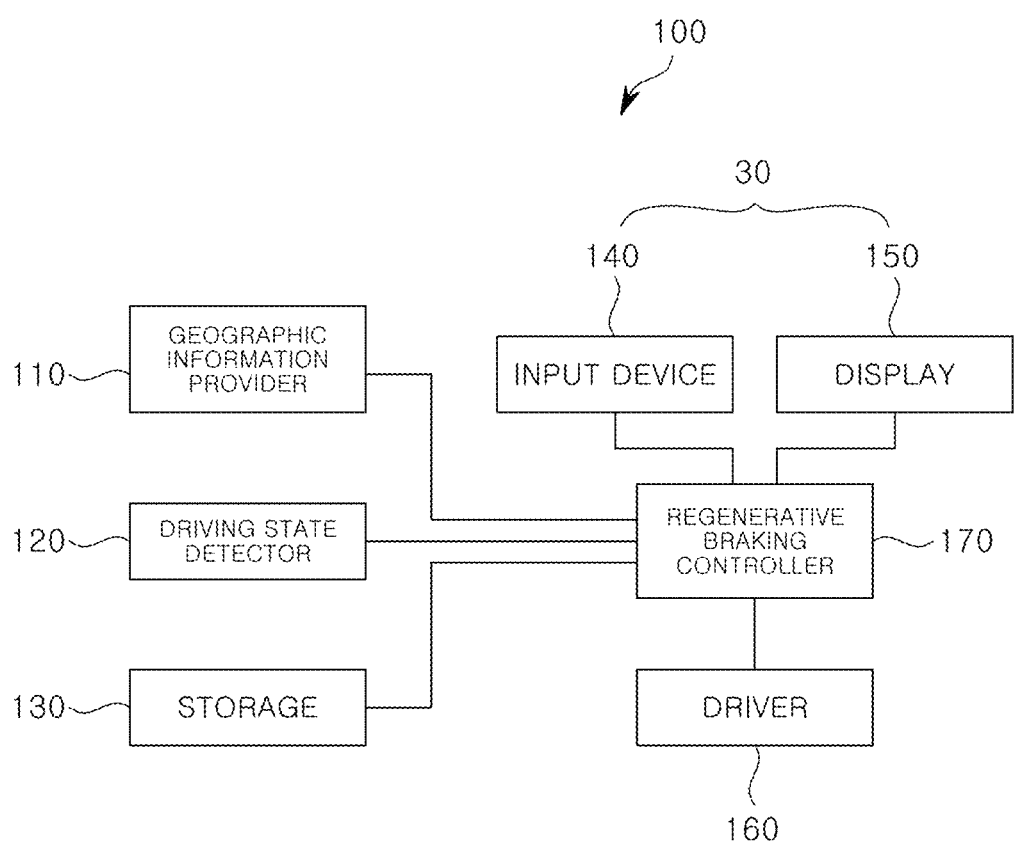
FIG. 3 is a block diagram exemplarily illustrating a control system of a vehicle according to an exemplary embodiment of the present disclosure.

Referring to FIG. 3, a control system for performing regenerative braking in the electric vehicle 1 according to an exemplary embodiment of the present disclosure will be described. A regenerative braking device 100 according to an exemplary embodiment of the present disclosure may include a geographic information provider 110, a driving state detector 120, a storage 130, an input device 140, a display 150, a driver 160, and a regenerative braking controller 170.

The geographic information provider 110 may provide the regenerative braking controller 170 with information related to a type of road on which the electric vehicle 1 is traveling by use of a navigation device mounted on the electric vehicle 1. The geographic information provider 110 may provide information on which road among roads such as city roads, highways, and local roads the electric vehicle 1 is traveling on.

The driving state detector 120 may detect an inclination of a road on which the electric vehicle 1 is traveling or an acceleration state of the electric vehicle 1. In other words, the driving state detector 120 may detect whether the road on which the electric vehicle 1 is positioned is inclined, resulting in determining whether the electric vehicle 1 is positioned on an uphill road or a downhill road. For example, the driving state detector 120 may determine that the electric vehicle 1 is positioned on an inclined terrain when a tilting of the electric vehicle 1 is greater than a predetermined value.

Furthermore, the driving state detector 120 may determine whether the electric vehicle 1 is in a rapid acceleration state, and may determine whether the electric vehicle 1 is in the rapid acceleration state by use of a change rate of an accelerator pedal 40 of the electric vehicle 1. For example, the driving state detector 120 may determine that the electric vehicle 1 is in the rapid acceleration state when the change rate of the accelerator pedal 40 is greater than a predetermined value.

Furthermore, the driving state detector 120 may detect a speed of the electric vehicle 1. The driving state detector 120 may detect the speed of the electric vehicle 1 currently running.

The storage 130 may store a map table for engine brake torque values of an internal combustion engine vehicle. In the map table, the engine brake torque values according to combinations of engine and transmission stages are organized as a table. For example, the torque values of engine brake with engine A and 8-speed gear may be stored as a table such as Table 1, and the torque values of engine brake with engine B and 6-speed gear may be stored as a table such as Table 2.

TABLE 1

Example of a map table for torque values of engine brake with engine A & 8 speed gear

| vehicle speed range | Gear stage Gear ratios | engine brake torque values | | | | |
|---|---|---|---|---|---|---|
| | | City driving | General driving | Highway driving | Inclined terrain | Rapid acceleration |
| 0 Km/h~15 Km/h | 1st gear | A | A' | A" | A % | A# |
| 15 Km/h~30 Km/h | 2nd gear | B | B' | B" | B % | B# |
| 30 Km/h~45 Km/h | 3rd gear | C | C' | C" | C % | C# |
| 45 Km/h~60 Km/h | 4th gear | D | D' | D" | D % | D# |
| 60 Km/h~75 Km/h | 5th gear | E | E' | E" | E % | E# |
| 75 Km/h~90 Km/h | 6th gear | F | F' | F" | F % | F# |
| 90 Km/h~105 Km/h | 7th gear | G | G' | G" | G % | G# |
| 105 Km/h~ | 8th gear | H | H' | H" | H % | H# |

TABLE 2

Example of a map table for torque values of engine brake with engine B & 6 speed gear

| vehicle speed range | Gear stage Gear ratios | engine brake torque values | | | | |
|---|---|---|---|---|---|---|
| | | City driving | General driving | Highway driving | Inclined terrain | Rapid acceleration |
| 0 Km/h~20 Km/h | 1st gear | I | I' | I" | I % | I# |
| 20 Km/h~40 Km/h | 2nd gear | J | J' | J" | J % | J# |

TABLE 2-continued

Example of a map table for torque values of engine brake with engine B & 6 speed gear

| vehicle speed range | Gear stage Gear ratios | engine brake torque values | | | | |
|---|---|---|---|---|---|---|
| | | City driving | General driving | Highway driving | Inclined terrain | Rapid acceleration |
| 40 Km/h~60 Km/h | 3rd gear | K | K' | K" | K % | K# |
| 60 Km/h~80 Km/h | 4th gear | L | L' | L" | L % | L# |
| 80 Km/h~100 Km/h | 5th gear | M | M' | M" | M % | M# |
| 100 Km/h~ | 6th gear | N | N' | N" | N % | N# |

Furthermore, the storage 130 may store a predetermined value for the tilting of the electric vehicle 1 and a predetermined value for the change rate of the accelerator pedal 40 of the electric vehicle 1.

The input device 140 may receive information such as a navigation mode, an autonomous driving mode, a front monitoring mode, and a regenerative braking level setting by the user. Information may be input to the input device 140 through the user interface device 30. For example, the user may select a map table for engine brake torque values according to a combination of an engine and a transmission gear stored in the storage 130 to set the regenerative braking level through the input device 140. In other words, the user may select the engine brake torque values for engine A and 8 speed gear or the engine brake torque values for the engine B and the 6 speed gear.

The display 150 may display various information related to the electric vehicle 1 driven by the user, and may be displayed through the user interface device 30. The display 150 may display information on the navigation mode, the autonomous driving mode, the front monitoring mode, and the regenerative braking levels.

For example, the display 150 may display the regenerative braking level for the engine brake torque values according to a combination of an engine and a transmission gear selected by the user. Furthermore, the display 150 may display the current speed of the electric vehicle 1 as well. In other words, when the user selects the engine brake torque value for engine A and 8 speed gear, selection of the corresponding engine brake torque value may be displayed.

The driver 160 may control the speed and acceleration of the electric vehicle 1 and also perform regenerative braking of the electric vehicle 1. The driver 160 may drive the electric vehicle 1 based on a virtual engine brake torque value when regenerative braking is performed under the control of the regenerative braking controller 170.

The regenerative braking controller 170 may be configured to determine the regenerative braking level based on the map table stored in the storage 130 by use of information received from the geographic information provider 110 and the driving state detector 120 and information input through the input device 140, and control the driver 160 to drive the electric vehicle 1 according to the determined regenerative braking level.

For example, the regenerative braking controller 170, when the user selects regenerative braking to be performed according to the engine brake torque value for the engine A and the 8 speed gear through the input device 140, may be configured to determine the virtual engine brake torque value according to the regenerative braking by use of the map table according to the corresponding engine brake torque value based on a location where the electric vehicle 1 is positioned and a driving condition through the geographic information provider 110 and the driving state detector 120. Furthermore, the regenerative braking controller 170 may control the driver 160 to perform regenerative braking according to the current speed of the electric vehicle 1 based on the determined torque value.

Furthermore, the regenerative braking controller 170 may control the display 150 so that the current regenerative braking level is displayed on the display 150, and when the regenerative braking level is changed, control the display 150 so that the changed regenerative braking level is displayed on the display 150 in real time.

The regenerative braking controller 170 may be implemented by an arithmetic device including a microprocessor, memory, and the like, and the implementation method is obvious to those skilled in the art, so further detailed explanation is omitted.

Figure 4:
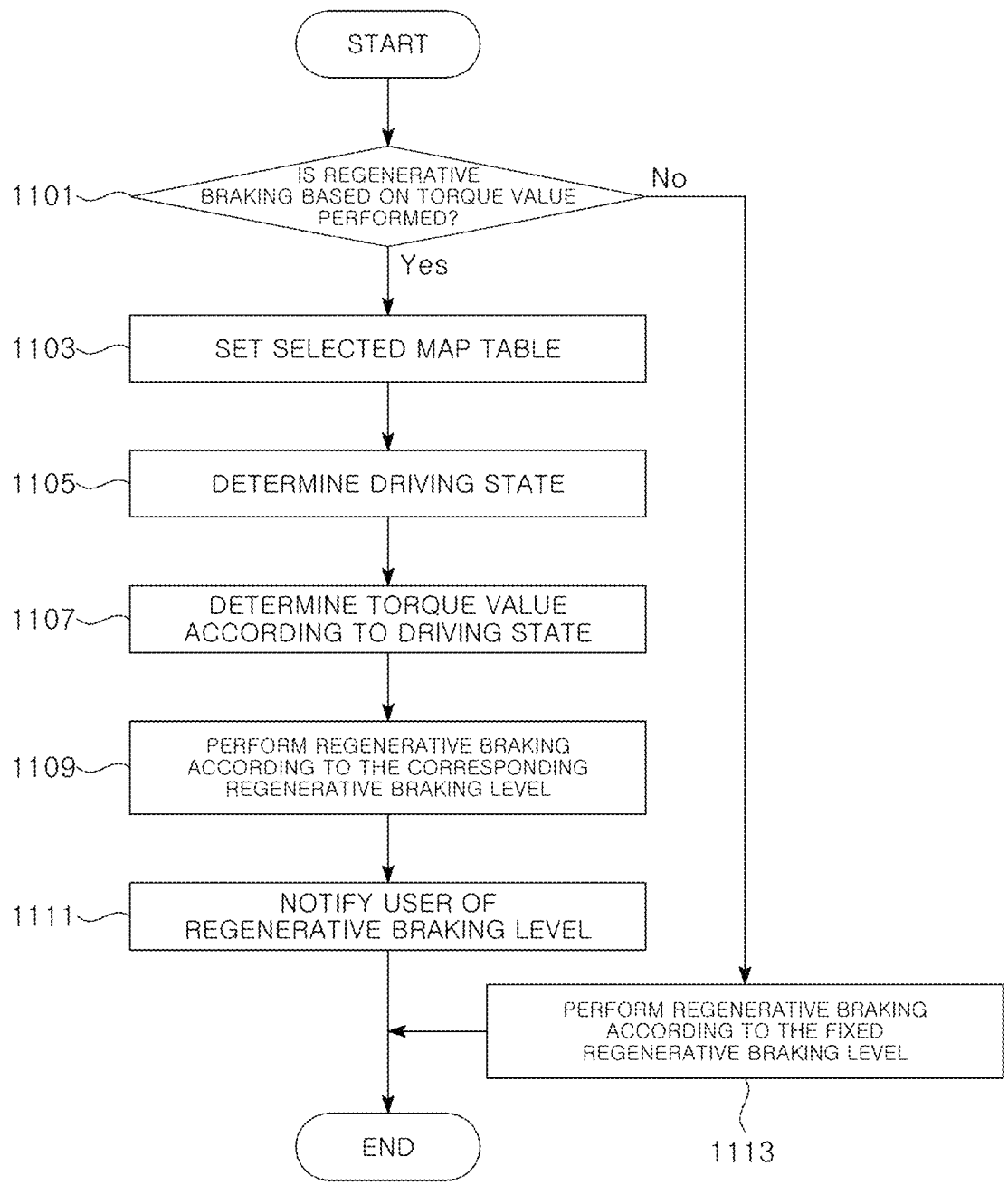
FIG. 4 is a flowchart exemplarily illustrating a method of controlling a vehicle according to an exemplary embodiment of the present disclosure.

Referring to FIG. 4, a method of controlling the electric vehicle 1 according to an exemplary embodiment of the present disclosure will be described. While explaining the method of controlling the electric vehicle 1 according to an exemplary embodiment of the present disclosure, it will be described with reference to the drawing shown in FIG. 3 and furthermore to with reference to the drawings shown in FIGS. 5 to 8.

Whether to perform regenerative braking based on the torque value according to the engine and gear ratios is determined (1101).

The regenerative braking controller 170 is configured to determine whether to perform regenerative braking based on the torque value according to the engine and the gears ratios, and may make the determination based on information received from the user through the input device 140. For example, when the user selects an item to perform regenerative braking based on the torque value received through the input device 140 of the user interface device 30, the regenerative braking controller 170 is configured to determine that regenerative braking is performed based on the selected torque value. At the instant time, the user may select a type such as an engine A and 8-speed transmission, engine V and 6-speed transmission, and the like.

The selected map table is set (1103).

When engine types and gear ratios are selected by the user so that regenerative braking is performed based on the torque value, the regenerative braking controller 170 selects and sets a map table for the corresponding engine types and gear ratios stored in the storage 130. As in the examples shown in Tables 1 and 2, the map table may be a table in which torque values are set according to the speed range of the electric vehicle 1, the gear ratios, and the driving state of the electric vehicle 1.

The driving state of the vehicle is determined (1105).

When the regenerative braking controller 170 selects and sets the map table stored in the storage 130, the driving state of the electric vehicle 1 is determined. The driving state of the electric vehicle 1 may include one or more of the speed of the electric vehicle 1, whether or not the electric vehicle 1 is in the rapid acceleration state, driving roads on which the electric vehicle 1 is traveling, whether or not the electric vehicle 1 is traveling on inclined terrain. Furthermore, the driving state of the electric vehicle 1 may be identified through the geographic information provider 110 and the driving state detector 120.

As shown in Tables 1 and 2, since the torque value of the engine brake may vary depending on the speed of the electric vehicle 1, the gear ratios, city driving, general driving, highway driving, inclined terrain, and rapid acceleration of the electric vehicle 1, the regenerative braking controller 170 is configured to determine the driving state of the electric vehicle 1 based on the present information.

Figure 5:
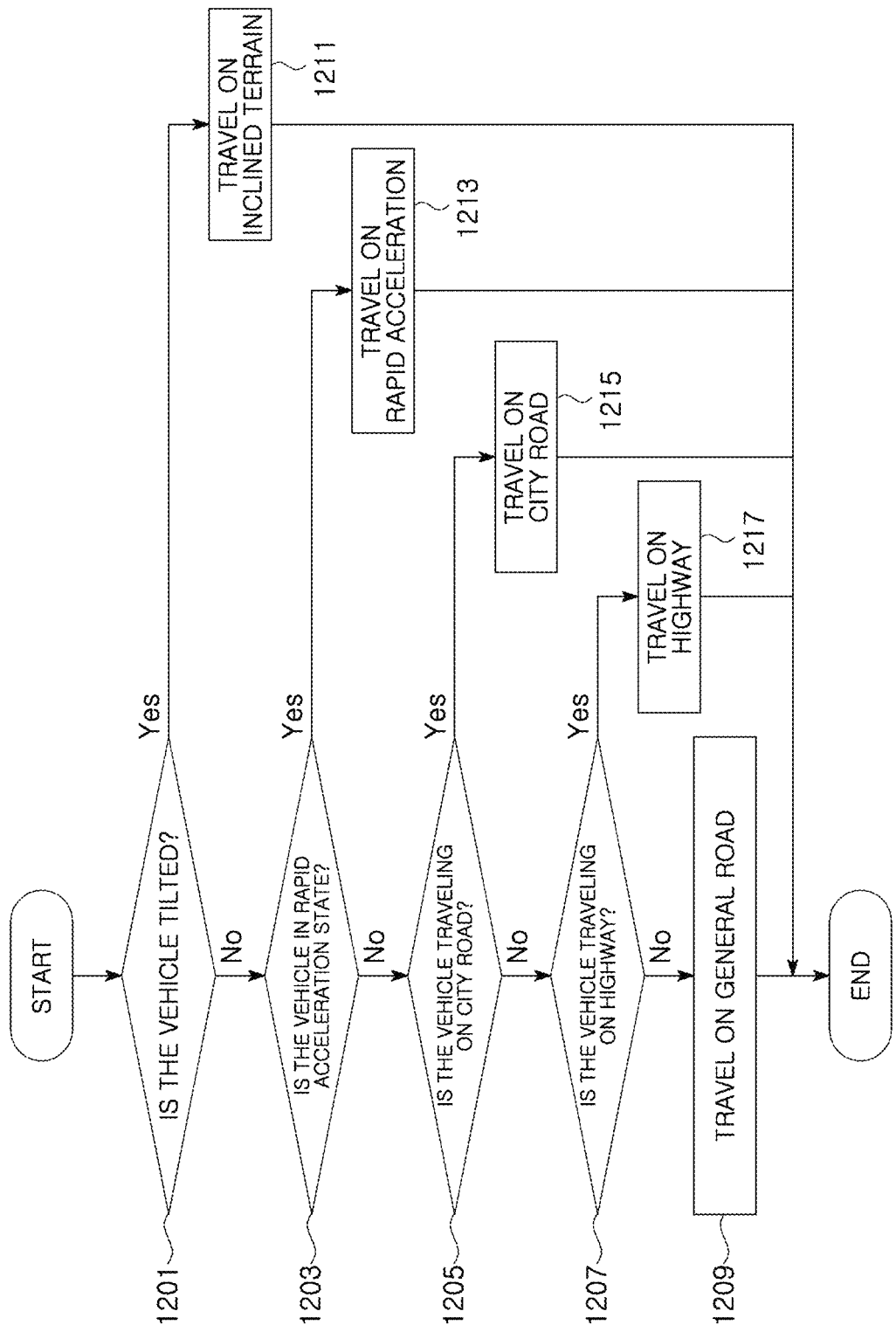
FIG. 5 is a flowchart exemplarily illustrating determining a driving state of a vehicle in a method of controlling a vehicle according to an exemplary embodiment of the present disclosure.

For example, the determination of the driving state of the electric vehicle 1 may be performed according to the flowchart shown in FIG. 5. Referring to FIG. 5, operation 1105 will be described in more detail.

First, whether or not the vehicle is tilted is determined (1201).

The driving state detector 120 is configured to determine the degree of inclination of the electric vehicle 1, and for example when the tilting of the electric vehicle 1 is greater than a predetermined value (Yes in 1201), is configured to determine that the electric vehicle 1 is positioned on an inclined terrain (1211). At the instant time, the driving state detector 120 may also determine whether the electric vehicle 1 is positioned on an uphill road or a downhill road among inclined terrain according to the tilting of the electric vehicle 1.

Whether the vehicle is in the acceleration state is determined (1203).

The driving state detector 120 determines whether the electric vehicle 1 is in the rapid acceleration state, and for example when the change rate of the accelerator pedal 40 is greater than a predetermined value (Yes in 1203), determines that the electric vehicle 1 is in the rapid acceleration state (1213). In other words, whether to accelerate rapidly may be determined according to the degree to which the user steps on the accelerator pedal 40.

Whether or not the vehicle is traveling on a city road is determined (1205).

The regenerative braking controller 170 is configured to determine whether the electric vehicle 1 is on the city road through the geographic information provider 110. At the instant time, the geographic information provider 110 may provide information on the current location of the electric vehicle 1 and map information to the regenerative braking controller 170 by use of the map information and a global navigation satellite system (GNSS).

Whether or not the vehicle is traveling on a highway is determined (1207).

Upon determining that the electric vehicle 1 is not on the city road, the regenerative braking controller 170 is configured to determine whether the electric vehicle 1 is driving on the highway. At the instant time, the geographic information provider 110 may provide information on the current location of the electric vehicle 1 and map information to the regenerative braking controller 170 by use of the map information and the GNSS.

Whether the vehicle is traveling on a general road is determined (1209).

Upon determining that the electric vehicle 1 is not on the highway, the regenerative braking controller 170 is configured to determine whether the electric vehicle 1 is driving on the general road such as a local road. At the instant time, the geographic information provider 110 may provide information on the current location of the electric vehicle 1 and map information to the regenerative braking controller 170 by use of the map information and the GNSS.

In response to the driving state of the vehicle being determined, a torque value according to the driving state thereof is determined (1107).

Figure 6:
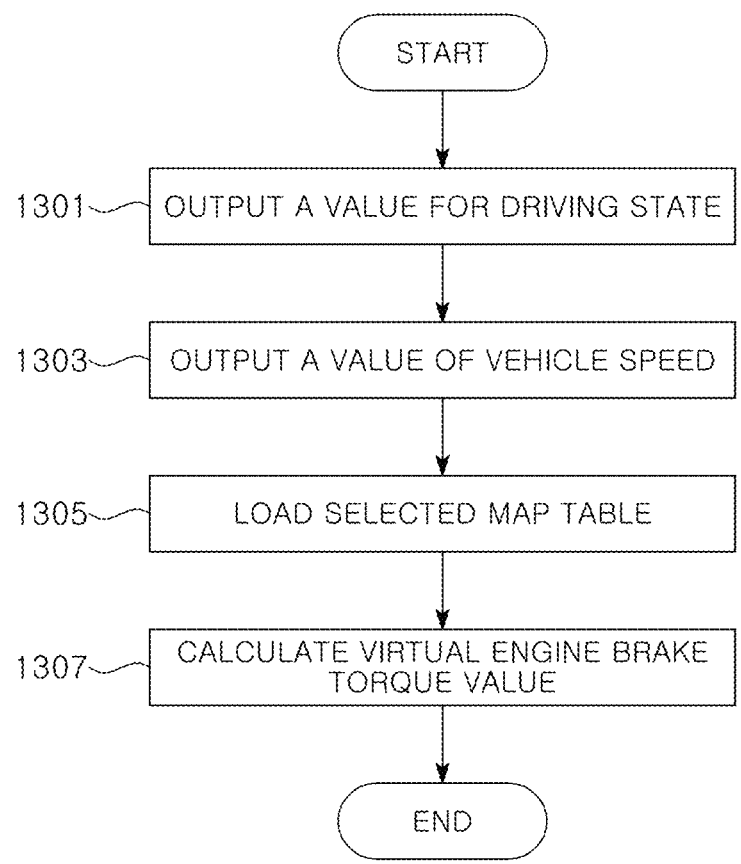
FIG. 6 is a flowchart exemplarily illustrating determining a virtual engine brake torque value for a driving state of a vehicle in a method of controlling a vehicle according to an exemplary embodiment of the present disclosure.

When the driving state of the electric vehicle 1 is determined through operation 1105, an amount of torque of virtual engine brake is determined by use of map data corresponding to the driving state. In operation 1107, the determination of the virtual engine brake torque value may be performed according to the flowchart shown in FIG. 6. Referring to FIG. 6, operation 1107 will be described in more detail.

A value for the driving state of the vehicle is output (1301).

The value for the driving state of the electric vehicle 1 is a value determined in operation 1105. In other words, through operation 1105, whether the electric vehicle 1 is positioned on the inclined terrain and whether to accelerate rapidly are determined, and a result of determining which road driving on among city roads, highways, and general roads is output.

A value of the vehicle speed is output (1303).

A current driving speed value of the electric vehicle 1 is output. As described above, since the engine brake torque value varies depending on the driving speed of the electric vehicle 1, the current driving speed of the electric vehicle 1 is detected by the driving state detector 120 and the speed value thereof is output.

The selected map table is loaded (1305).

The map table set in operation 1103 is loaded. As shown in Tables 1 and 2, the map table is a table in which torque values are set according to the speed range of the electric vehicle 1, the gear ratios, and the driving states of the electric vehicle 1.

A torque value of the virtual engine brake is determined (1307).

The torque value of the virtual engine brake corresponding to the driving states and current speed of the electric vehicle 1 output in operations 1301 and 1303 is determined based on the map table. In operation 1307, the torque value of the virtual engine brake may be identical to the torque value for the engine and gear ratio included in the map table, but is not limited thereto, and may have a different torque value due to a difference between the internal combustion engine vehicle and the electric vehicle 1.

Regenerative braking according to the corresponding regenerative braking level is performed (1109).

According to the virtual engine brake torque value determined in operation 1107, the regenerative braking controller 170 is configured to control the driver 160 to perform regenerative braking of the electric vehicle 1. Herein, the virtual engine brake torque value may vary in real time according to the driving speed of the electric vehicle 1, so that the regenerative braking controller 170 may control the driver 160 in real time.

Figure 7:
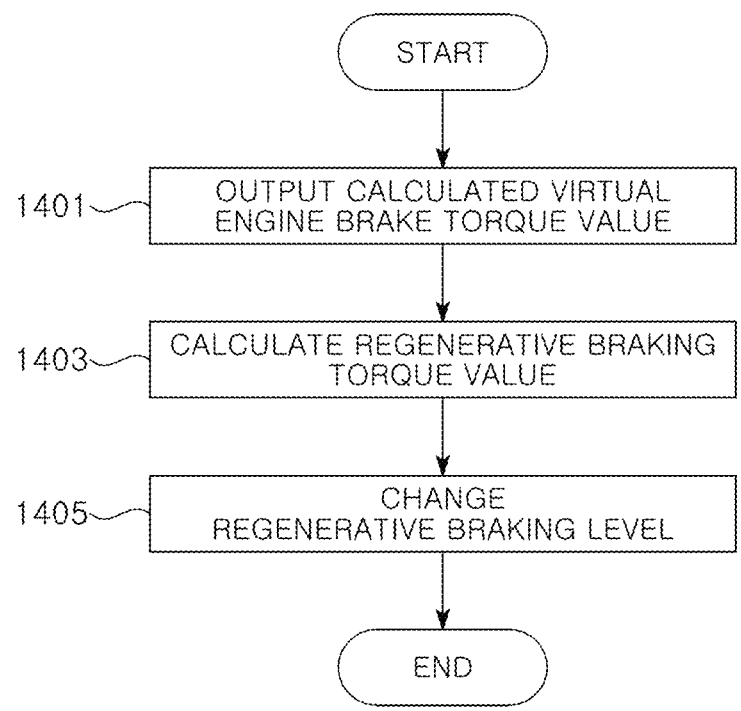
FIG. 7 is a flowchart exemplarily illustrating controlling a regenerative braking level matched to a selected virtual engine brake torque value in a method of controlling a vehicle according to an exemplary embodiment of the present disclosure.

In operation 1109, the fact that the regenerative braking controller 170 is configured to perform regenerative braking according to the virtual engine brake torque value may be performed according to the flowchart shown in FIG. 7. Referring to FIG. 7, operation 1109 will be described in more detail.

The determined virtual engine brake torque value is output (1401).

The virtual engine brake torque value is determined through operation 1107, and the determined virtual engine brake torque value is output. The output virtual engine brake torque value is a torque value based on the driving states of the electric vehicle 1.

A regenerative braking torque value is determined (1403).

The regenerative braking torque value corresponding to the virtual engine brake torque value output in operation 1401 is determined. At the instant time, the regenerative braking torque value is a torque value controlled by the driver 160 while the electric vehicle 1 performs regenerative braking.

The regenerative braking level is changed (1405).

The regenerative braking level is changed based on the regenerative braking torque value determined in operation 1403. The regenerative braking level may be a concept corresponding to the gear ratio in the internal combustion engine to which engine brake is applied.

The regenerative braking level is notified to the user (1111).

When the regenerative braking level is changed through operation 1109, the regenerative braking controller 170 may control the display 150 to inform the user of the changed regenerative braking level. In other words, because the change in the regenerative braking level is displayed on the display 150, the user may identify the regenerative braking level while the regenerative braking is being performed. Accordingly, the driver may identify the regenerative braking level according to the speed of the electric vehicle 1.

Figure 8:
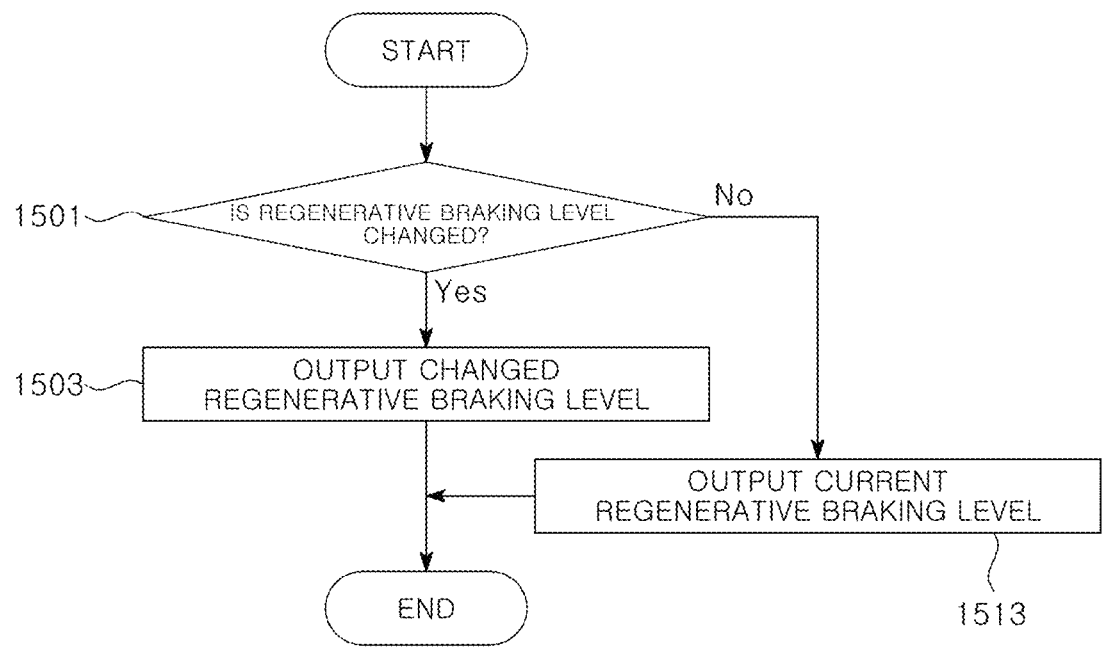
FIG. 8 is a flowchart exemplarily illustrating outputting a value of a changed regenerative braking level in a method of controlling a vehicle according to an exemplary embodiment of the present disclosure.

In operation 1111, the fact that the regenerative braking controller 170 informs the user of regenerative braking may be performed according to the flowchart shown in FIG. 8. Referring to FIG. 8, operation 1111 will be described in more detail.

Checking when the regenerative braking level has been changed is performed (1501).

The regenerative braking controller 170 checks whether the regenerative braking level has been changed, as in operation 1109.

Outputting the changed regenerative braking level value is performed (1503).

The regenerative braking controller 170 is configured to control the display 150 so that the changed regenerative braking level value is output on the display 150.

Outputting the current regenerative braking level value is performed (1513).

If the regenerative braking level value has not been changed, the regenerative braking controller 170 is configured to control the display 150 so that the current regenerative braking level value is displayed on the display 150.

Regenerative braking according to the fixed regenerative braking level is performed (1113).

In operation 1101, when the user inputs that regenerative braking is not performed based on the torque value through the input device 140 (No in operation 1101), the regenerative braking controller 170 is configured to control the driver 160 to drive the electric vehicle 1 with the fixed (preset) regenerative braking level.

As is apparent from the above, according to various embodiments of the present disclosure, when users drive with regenerative braking in an electric vehicle, the regenerative braking level is changed and controlled based on the map table of the virtual engine brake, so that users may feel the same sensitivity as driving a vehicle with an internal combustion engine.

Furthermore, according to various embodiments of the present disclosure, although users drive the electric vehicle, it is possible to feel the sensitivity of driving like an internal combustion engine vehicle, reducing a sense of difference or inconvenience.

On the other hand, the above-described embodiments may be implemented in a form of a recording medium storing instructions executable by a computer. The instructions may be stored in a form of program code. When the instructions are executed by a processor, a program module is generated by the instructions so that the operations of the disclosed exemplary embodiments of the present disclosure may be conducted. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle, comprising:
   a processor configured to detect a driving state of an electric vehicle;
   a storage configured for storing a map table for engine brake torque values according to engine types and gear ratios of an internal combustion engine vehicle and road information including city roads, highways, and general roads;
   a driver configured to drive the electric vehicle;
   a regenerative braking controller electrically connected to the processor, the storage and the driver and configured to control, based on the driving state of the electric vehicle detected by the processor and the map table, the driver so that the electric vehicle performs regenerative braking based on each torque value; and
   a map information provider including the road information related to a road on which the electric vehicle is traveling,
   wherein the regenerative braking controller is further configured to determine which the road the electric vehicle travels on among the city roads, the highways, and the general roads through the map information provider, and configured to control the driver, based on the road information about which the electric vehicle is traveling, the driving state of the electric vehicle, and the map table in which the torque value of the engine brake varies depending on a speed of the electric vehicle, the gear ratios, and the road information including the city roads, the highways, and the general roads so that the electric vehicle performs the regenerative braking based on the torque value.

2. The vehicle of claim 1, wherein the regenerative braking controller is further configured to determine whether the electric vehicle is positioned on an inclined terrain and whether the electric vehicle is in a rapid acceleration state, through the processor.

3. The vehicle of claim 1, wherein the map table includes information on the engine brake torque values based on the engine types and the gear ratios of the internal combustion engine vehicle.

4. The vehicle of claim 1, further including:
   an input device in which information is input by a user so that the electric vehicle performs the regenerative braking based on the torque value; and
   a display configured for displaying information on which the regenerative braking of the electric vehicle is performed.

5. The vehicle of claim 1, wherein the regenerative braking controller is further configured for performing, when the electric vehicle does not perform the regenerative braking based on the torque value, regenerative braking according to a preset fixed regenerative braking level.

6. The vehicle of claim 5, wherein the regenerative braking controller is further configured for determining a virtual engine brake torque value based on the map table according to the driving state of the electric vehicle and the speed of the electric vehicle.

7. The vehicle of claim 6, wherein the regenerative braking controller is further configured for determining a regenerative braking torque value by use of the virtual engine brake torque value.

8. The vehicle of claim 7, wherein the regenerative braking controller is further configured for changing a regenerative braking level according to the determined regenerative braking torque value.

9. A method of controlling a vehicle, the method comprising:
   setting a map table for engine brake torque values according to engine types, and gear ratios of an internal combustion engine vehicle and road information including city roads, highways, and general roads so that an electric vehicle performs regenerative braking based on each torque value;
   determining a driving state of the electric vehicle;
   determining, based on the driving state of the electric vehicle and the map table, the torque value according to the driving state of the electric vehicle; and
   performing the regenerative braking of the electric vehicle according to the torque value according to both the driving state of the electric vehicle and the map table in which the torque value of the engine brake varies depending on a speed of the electric vehicle, the gear ratios, and road information including city roads, highways, and general roads, wherein the determining of the driving state of the electric vehicle includes determining the road information on which the electric vehicle is traveling, and wherein the road information about which the electric vehicle is traveling includes one of the city roads, the highways, and the general roads.

10. The method of claim 9, further including determining whether the electric vehicle performs the regenerative braking based on the torque value.

11. The method of claim 10, wherein the map table is provided in plurality, wherein the determining whether to perform the regenerative braking includes selecting one of the plurality of map tables, and wherein the setting of the map table includes setting the map table selected in determining whether to perform the regenerative braking.

12. The method of claim 10, further including performing, when the electric vehicle does not perform the regenerative braking based on the torque value, regenerative braking according to a preset fixed regenerative braking level.

13. The method of claim 9, wherein the determining of the driving state of the electric vehicle includes determining at least one of whether the electric vehicle is positioned on an inclined terrain, and whether the electric vehicle is in a rapid acceleration state.

14. The method of claim 9, wherein the determining of the torque value according to the driving state of the electric vehicle includes determining a virtual engine brake torque value based on the map table according to the driving state of the electric vehicle and the speed of the electric vehicle.

15. The method of claim 14, wherein the performing of the regenerative braking of the electric vehicle includes determining a regenerative braking torque value by use of the virtual engine brake torque value.

16. The method of claim 15, wherein the performing of the regenerative braking of the electric vehicle includes changing a regenerative braking level according to the determined regenerative braking torque value.

17. The method of claim 16, further including informing a user of the changed regenerative braking level.

* * * * *